United States Patent [19]

Adamson et al.

[11] 4,309,132

[45] Jan. 5, 1982

[54] FACE MILL WITH ADJUSTABLE CUTTING INSERTS

[76] Inventors: Thomas Adamson, 5512 Colonial La., South Bend, Ind. 46614; Armand J. Schmaltz, 51233 Hollyhock Rd., South Bend, Ind. 46637

[21] Appl. No.: 125,576

[22] Filed: Feb. 28, 1980

[51] Int. Cl.³ ............................................. B26D 1/12
[52] U.S. Cl. ........................................ 407/38; 407/48; 407/49
[58] Field of Search ..................... 407/41, 46, 48, 49, 407/36, 38

[56] References Cited

U.S. PATENT DOCUMENTS

| | | | |
|---|---|---|---|
| 3,175,276 | 3/1965 | Weber et al. | 407/46 |
| 3,188,718 | 6/1965 | Wezel | 407/41 |
| 3,191,499 | 6/1965 | Solski et al. | 407/46 |
| 3,229,350 | 1/1966 | Yogus | 407/46 |

Primary Examiner—Leonidas Vlachos
Attorney, Agent, or Firm—Oltsch, Knoblock & Hall

[57] ABSTRACT

A face mill having individual, circumferentially spaced cutting inserts each individually adjustable by means of a wedging part.

6 Claims, 5 Drawing Figures

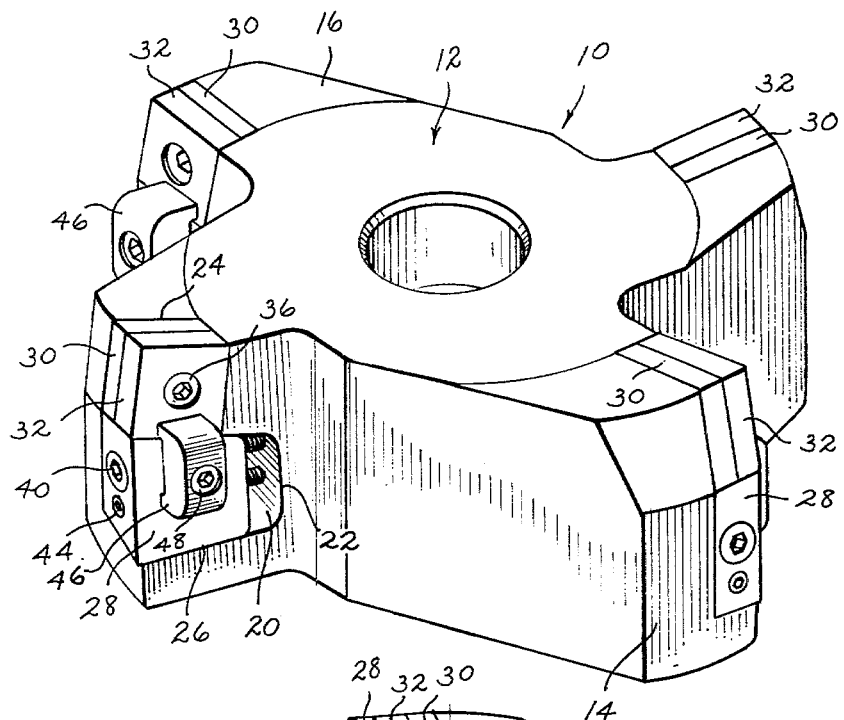
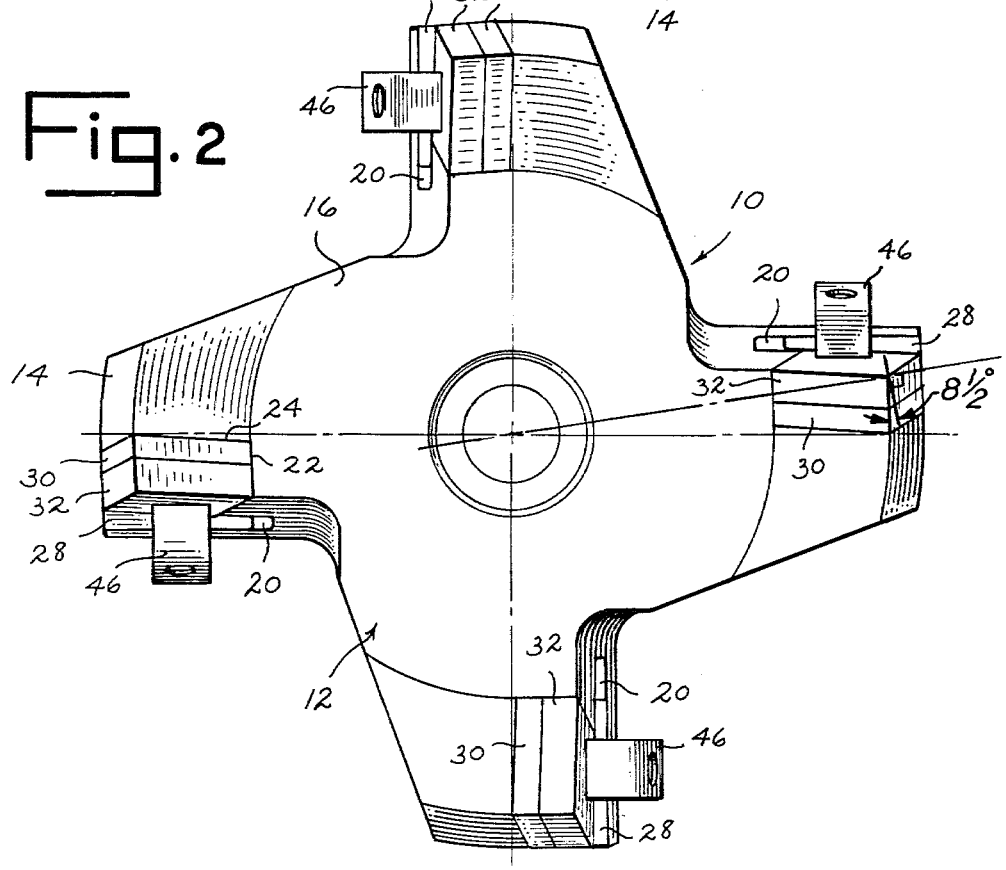

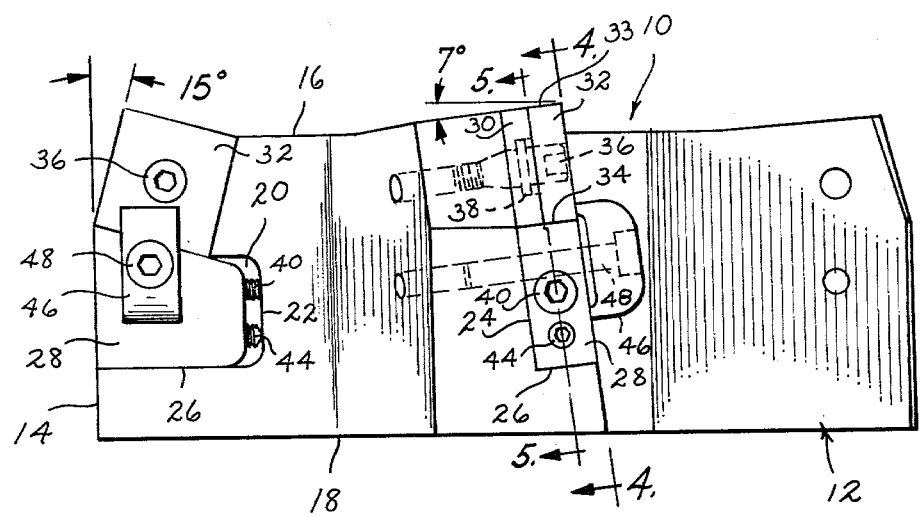

000
FACE MILL WITH ADJUSTABLE CUTTING INSERTS

SUMMARY OF THE INVENTION

This invention relates to a milling device and will have particular application to a face mill having individual cutting inserts which are each individually adjustable.

In the face mill of this invention, the individual cutting inserts can be adjusted so that all the inserts are within 0.0001 inches of the same plane in an approximate five minute set up time. This accurate adjustment of the cutting inserts provides for a smoother finish so that fewer cuts upon the workpiece are needed. Additionally, by providing accurately adjusted cutting inserts, the mill is able to operate more efficiently and at cooler operating temperatures, thus increasing wear time of the inserts. An insert when of a square configuration can be utilized at each of its eight cutting edges thereby allowing the insert to be used for a longer period of time.

Accordingly, it is an object of this invention to provide a face mill having a multiplicity of cutting inserts which are each individually adjustable.

Another object of this invention is to provide a face mill which has accurately adjustable cutting inserts and which will provide a smooth cut upon a workpiece.

Still another object of this invention is to provide a face mill having individually adjustable cutting inserts, each of which may be utilized at each of its eight cutting edges so as to prolong the useful life of the insert.

Still another object of this invention is to provide a face mill which can be adjusted for a cutting operation within a minimum length of set up time.

And still another object of this invention is to provide a face mill having individually adjustable cutting inserts which are utilized with a negative rake angle.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a perspective view of the face mill.
FIG. 2 is a top plan view.
FIG. 3 is a side view.
FIG. 4 is a fragmentary view as seen from line 4—4 of FIG. 3.
FIG. 5 is an enlarged sectional view taken along line 5—5 of FIG. 3.

DESCRIPTION OF THE PREFERRED EMBODIMENT

The preferred embodiment illustrated is not intended to be exhaustive or to limit the invention to the precise form disclosed. It is chosen and described in order to best explain the principles of the invention, its application and practical use to thereby enable others skilled in the art to best utilize the invention.

Face mill 10 shown in the figures includes a body 12 which is rotatable about a cutting axis. Body 12 includes a circumferential end edge 14 which extends between an outer side face 16 and an inner side face 18. A plurality of circumferentially spaced sockets 20 are formed in body 12 about its end edge 14. Each socket is defined by a bottom wall 22, a side wall 24, and an end wall 26. The bottom wall 22 and side wall 24 of each socket 20 extends from outer face 16 of the body and terminates at end wall 26 which is spacedly located from body inner face 18.

As shown in the illustrated and preferred embodiment, within each socket 20 in facemill body 12 there is carried a wedge member 28, a shim 30 and an insert 32. Each insert 32 forms a cutter for face mill 10 and is constructed from a suitable hard material. Within each socket 20, a wedge member 28 is positioned against the socket side wall 24 and end wall 26 and is spaced from socket bottom wall 22. Shim 30 is positioned against wedge member 28, socket side wall 24 and bottom wall 22. Insert 32 is positioned against wedge member 28, shim 30 and socket bottom wall 22. Wedge member 28 includes a camming surface 34 which both shim 30 and insert 32 contact. Shim 30 and insert 32 are located within each socket 20 and against wedge member camming surface 34 by means of a lock pin 36. Lock pin 36 extends through center openings in each of the shim and insert and is threaded into side wall 24 of the socket. The diameter of lock pin 36 is slightly less than the size of openings within shim 30 and insert 32 so as to permit the shim and insert to both experience restricted transverse movement relative to the lock pin. Lock pin 36 is provided with a circumferential flange 38 which serves to retain shim 30. As pin 36 is turned into socket side wall 24 the insert 32 is urged slightly against the side wall 24 due to the difference in spacing between the pin and side wall and the center opening of the insert and side edge of the insert. Thus each insert 32 is urged by a pin 36 against socket side wall 24 but is able along with adjacent shim 30 to experience limited transverse movement over side wall 24.

An adjustment screw 40 extends through each wedge member 28. The shank of adjustment screw 40 extends with clearance through the wedge member and is threaded into bottom wall 22 of the socket. The head 45 of the adjustment screw abuts wedge member 28 so that upon rotative movement of the screw into socket bottom wall 22 the wedge member will be urged into the socket causing both contacting shim 30 and insert 32 to be cammed outwardly of outer face 16 of the body. There is a sufficient degree of freedom of movement between lock pin 36 and shim 30 and insert 32 to permit the shim and insert to move transversely relative to the lock pin, thereby accommodating adjustable setting of the insert relative to outer face 16 of face mill body 12 and the other inserts.

A lock screw 44 is threaded through each wedge member 28 into abutment with bottom wall 22 of the socket. Once an adjustment screw 40 has been rotated and the associated insert 32 set, the adjacent lock screw 44 is tightened against socket bottom wall 22 so as to secure the wedge member 28 against movement relative to its adjustment screw 40 and body 12 of the face mill.

Additionally, when it is desired to reset the inserts for another milling operation or to change inserts, lock screws 44, with adjustment screws 40 loosened, can be further turned against socket bottom walls 22 to release the wedge members 28 from their compressed contacting relationship with shims 30 and inserts 32. Also should an adjustment screw 40 be turned too far during adjustment of an insert, the adjacent lock screw 44 can be turned against socket bottom wall 22 to back the wedge member 28 out of the socket.

A clamp part 46 is provided in contact with each insert 32 and adjacent wedge member 28. Each clamp part 46 is tightened against its contacting insert and wedge member by means of a screw 48 which extends through the clamp part and a slotted opening 50 in the wedge part and is threaded into side wall 24 of the socket. Clamp parts 46 serve as retainers for wedge members 28 and inserts 32.

During the milling operation each insert 32 is fully supported by a shim 30 which reduces chatter and vibration with the shim being fully supported in turn by side wall 24 of the receiving socket 20 of the face mill. The final setting adjustments of inserts 32 are preferably made with the lock pins 36 and clamp parts 46 fully tightened. This is accomplished due to the wedging force created by wedge members 28 and the fact that in final adjustment of inserts 32 the movement of an insert and shim relative to body 12 of the face mill is generally but a few thousandths of an inch.

In the preferred embodiment the rake angle of each insert 32 as measured along outer edge 33 is of a negative type and of 7 degrees as illustrated in FIG. 3. The lead angle, which controls the chip direction, is 15 degrees. The insert clearance angle is 8½ degrees as seen in FIG. 2. Each insert 32 has four corners with each corner having two potential cutting edges. The number of inserts per face mill will vary depending upon mill size and type of milling operation. Additionally, it is to be understood that a face mill body may be provided with any number of sockets to accommodate a wedge member, shim and insert, with only a selected number of such sockets actually being used depending upon the need and type of milling operation.

It is to be understood that the invention is not to be limited to the details above given, but may be modified within the scope of the appended claims.

What we claim is:

1. A face mill comprising a body rotatable about an axis and including a circumferential end edge extending between first and second side faces; said body having a plurality of circumferentially spaced sockets formed therein about said end edge; each socket defined by side and bottom walls extending from said first side face and terminating at an end wall spacedly located from said second side face; a wedge member, insert and a shim each carried within at least two of said sockets; said wedge member being positioned adjacent said side wall and end wall spaced from the bottom wall of its receiving socket, said shim being positioned in contact with said wedge member and against said socket side and bottom walls, and said insert being positioned next to said shim against said bottom wall and in contact with said wedge member, means for retaining said shim and insert in contact with said wedge member; means associated with each wedge member for urging the wedge member into said socket toward said socket bottom wall to cam said insert and shim part away from said socket end wall and beyond the plane of said first side face of said body; said means for urging said wedge member being a screw member having a head abutting and a shank extending freely through the wedge member, said screw member threaded into said socket bottom wall wherein upon rotation of the screw member the wedge member will be drawn toward the socket bottom wall; a second screw member associated with each wedge member, said second screw member threaded into said wedge member and extending therethrough into abutment with the bottom wall of its receiving socket, said second screw member constituting means for securing said wedge member against movement relative to said first mentioned screw member and face mill body; said shim and insert retainer means being a lock pin extending through said shim and insert and into said socket side wall, said shim and insert being shiftable transversely relative to said pin to accommodate camming movement of the wedge member.

2. The face mill of claim 1 and a clamp part carried by said face mill contacting each wedge member and its engaging insert to urge the insert against said underlying shim and said wedge member against said socket side wall.

3. The face mill of claim 2 wherein each insert includes a cutting edge extending at a negative rake angle.

4. The face mill of claim 3 wherein said rake angle is 7 degrees.

5. The face mill of claim 4 wherein each insert has a 15 degree lead angle.

6. The face mill of claim 2 and a third screw member extending through said clamp part and said wedge member, said third screw member being turned into said body to enable said clamp part to contact said wedge member and insert, said wedge member having a bore, said third screw member extending through said bore, said bore being oversize to accommodate movement of said wedge member into said socket relative to said third screw member.

* * * * *